3,265,653
WATER-SOLUBLE FLEXIBILIZER FOR PHENOLIC RESINS COMPRISING A METHYLOLATED AMINE TERMINATED POLYESTER
John R. Le Blanc, Wilbraham, Mass., assignor to Monsanto Company, a corporation of Delaware
No Drawing. Filed Dec. 16, 1963, Ser. No. 330,557
10 Claims. (Cl. 260—29.3)

This invention relates to a particular water-soluble polyester and more specifically to an aqueous phenol-formaldehyde resin composition containing dissolved in the aqueous phase the particular water-soluble polyester which resin composition when advanced to the infusible state has unexpectedly excellent flexibility.

It is notoriously well-known that when phenol-formaldehyde resins are advanced or cured to an infusible state, the resins are very brittle. The slightest bending of a cast thin film of a phenol-formaldehyde resin, for example, will result in immediate cracking or breaking of the film. To relieve the brittle characteristics of a phenol-formaldehyde resin, certain additives have been incorporated therein in order to impart flexibility to the cured or infusible phenolic resin. In general these additives are of the thermoplastic type of materials and have included such compounds as polyvinyl butyral, polyvinyl alcohol, plasticizers of the polymeric and non-polymeric type such as phthalate esters, phosphate esters, polyesters, etc., which compositions are generally physical mixtures of the component parts. Unfortunately, these additives have certain serious drawbacks in that in order to obtain any degree of flexibility in the cured resin, large amounts of the additive had to be used which resulted in a deficiency of the other desirable properties of the phenol-formaldehyde resin such as its bonding strength, water absorption, etc. In addition, these additives are rarely soluble in or compatible with the cured resin and thus the additive would exude out from the cured phenolic. This would then cause a decrease in the effectiveness of the additive to impart flexibility to the cured phenol-formaldehyde resin. Therefore, it has now been discovered that a particular novel water-soluble compound can be dissolved in an aqueous phenol-formaldehyde resin and that when the composition is advanced to the infusible state, the cured or infusible composition has outstanding flexibility.

Therefore, it is an object of this invention to provide a novel compound which is a water-soluble methylolated amine terminated polyester.

Another object of this invention is to provide an aqueous thermosetting phenol-formaldehyde resin composition having dissolved therein the water-soluble methylolated amine terminated polyester.

Still another object of this invention is to provide an aqueous solution of the methylolated amine terminated polyester.

Other objects of this invention will in part be obvious and will in part be set out and appear hereinafter.

Briefly, these and other objects of this invention are attained by adding to an aqueous phenol-formaldehyde resin a compound comprising a water-soluble methylolated amine terminated polyester. It is essential herein that the polyester be methylolated.

The following examples are set forth to illustrate more clearly the principles and practices of this invention to one skilled in the art and they are not intended to be restrictive but merely to be illustrative of the invention herein contained. Unless otherwise stated herein, all parts and percentages are on a weight basis.

EXAMPLE I

One hundred and twenty-four (124) parts of ethylene glycol are refluxed at 150–210° C. with 2.25 mols of adipic acid. The reaction is run for about one hour in an inert nitrogen atmosphere. During the reaction water is distilled off.

The reaction product obtained above is a carboxyl terminated polyester and is cooled to about 150° C. One mol of ethylene diamine is then added per each carboxyl group. The reaction is refluxed for about 30 minutes at 150–180° C. Again during the reaction, additional water is distilled off. The reaction is then cooled to room temperature and the resulting product is the polyethylene glycol adipate/ethylene diamine condensate. The product is waxy and is a solid at room temperature.

The condensate so prepared is reacted with an excess amount of formaldehyde (a 50% formalin solution) at 100° C. until the waxy solid is completely dissolved. The reaction is cooled to room temperature and the solution formed is the methylolated amine terminated polyester.

Four parts of the methylolated polyester on a weight basis are dissolved in 10 parts of water which system is a single phase liquid system. The resulting single phase liquid composition shows the solubility characteristics of the methylolated amine terminated polyester in water.

EXAMPLE II

Example I is repeated except that the methylolated amine terminated polyester is dissolved in an aqueous phenol-formaldehyde liquid resin instead of water. The phenol-formaldehyde resin employed herein is the reaction product of about 1.4 mols of formaldehyde per mol of phenol and has a resin solids content of about 67 weight percent.

A small portion of the resin composition prepared above is cast on a hot plate and cured to a thin clear film of about 10 mils thickness at 165° C. for about 30 minutes. The cured film is stripped from the hot plate and cooled to room temperature. The film is then bent through an arc of 180° without breaking or cracking. The cast film is then tested for both acetone and pyridine resistance by immersion therein for 16 hours. The film is found to be resistant to both acetone and pyridine in that the film is still intact and can still be bent through an arc of 180° without breaking or cracking.

A portion of the aqueous phenol-formaldehyde resin without the water-soluble methylolated amine terminated polyester is cast into a film in the same manner by casting a film on a hot plate and curing for 30 minutes at 165° C. This film is found to be brittle and immediately cracks upon attempting to bend the film.

EXAMPLE III

Example I is repeated except that in place of adipic acid, maleic anhydride is employed herein.

The results obtained are the same as obtained in Example I.

EXAMPLE IV

Example I is repeated except that in place of ethylene glycol and adipic acid employed therein, propylene glycol and phthalic anhydride are used herein.

The results obtained are the same as in Example I.

EXAMPLE V

Example I is repeated except that in place of the ethylene glycol employed therein, glycerol is used herein.

The results obtaned are the same as obtained in Example I.

This invention is directed to a particular compound comprising a water-soluble methylolated amine terminated polyester. In addition, this invention is also directed to an aqueous thermosetting phenol-formaldehyde resin composition having dissolved therein the novel amine terminated polyester. When the novel thermosetting resin composition of this invention is advanced to the infusible state, the infusible or cured resin composition is flexible. The degree of flexibility, as shown by the examples, is very surprising when considered in view of the extreme brittle characteristics of a phenol-formaldehyde resin per se without the amine terminated polyester.

The novel compound of this invention is prepared by first reacting a polyol with either a polybasic acid or an anhydride to form an intermediate product which is a carboxyl terminated polyester. This carboxyl terminated polyester is then reacted with a particular polyamine to form the amine terminated polyester. The particular polyamine employed in the practice of this invention is one containing 2 primary amine groups. The product thus formed from this reaction is an amine terminated polyester. This amine terminated polyester is a waxy solid at room temperature and is a cream color in appearance. The solid amine terminated polyester has a melting point of about 60° C. This material is then reacted with formaldehyde to form the methylolated amine terminated polyester. This material is readily soluble in water.

The polyols of this invention can be conveniently expressed by the following formula:

$$R(OH)_n$$

wherein R is selected from the group consisting of an aliphatic hydrocarbon of 2–18 carbon atoms, an aromatic hydrocarbon of 1 benzene ring and an alicyclic hydrocarbon of 2–18 carbon atoms, and wherein $n$ is an integer from 2–4. Examples of the particular polyols that can be used in place of those in the examples are pentaerithrytol, hexylene glycol, butylene glycol, 1,2-propylene glycol and 1,12-dodecyl glycol. The preferred polyol to be employed in the practice of this invention is ethylene glycol which contains two hydroxyl groups and 2 carbon atoms.

The intermediate product is then prepared by reacting the above described polyol with either a polybasic acid or an anhydride. The polybasic acid or anhydride employed in the practice of this invention can be either the aliphatic di- or tri-basic acids or anhydrides of 4–40 carbon atoms, aromatic di- or tri-basic acids or anhydrides of 1 benzene ring or alicyclic di- or tri-basic acids or anhydrides of 4–40 carbon atoms. It is essential in the practice of this invention that the polybasic acids or anhydrides be di- or tri-functional. They cannot be monofunctional. For convenience, the polybasic acid can best be shown as follows:

$$R_1(COOH)_m$$

wherein $m$ is an integer from 2 to 3 and $R_1$ is selected from the group consisting of an aliphatic hydrocarbon of 2–38 carbon atoms, an aromatic hydrocarbon of 1 benzene ring and alicyclic hydrocarbon of 2–38 carbon atoms. It is also understood that the anhydride form is also applicable in the practice of this invention. Some of the polybasic acids and anhydrides which can be employed in the practice of this invention and which can be used in place of the polybasic acids and anhydrides used in the examples are maleic acid, maleic anhydrides, succinic acid, succinic anhydride, isophthalic acid, phthalic acid, phthalic anhydride, citraconic acid, citraconic anhydride, glutaric acid, glutaric anhydrides, sebacic acid, terephthalic acid and dimerized fatty acids. The mol ratio to be employed when reacting the polybasic acid or anhydride can range from 1 to 4 mols thereof per mol of the polyol. However, it should be noted that there should at least be a slight excess of the polybasic acid or anhydride. For example, when employing a triol such as glycerol, at least 1½ to 2 mols of at least a dibasic acid should be reacted therewith. The preferred compound to be employed in preparing the intermediate product of this invention and to be reacted with the polyol is adipic acid.

As stated previously, the intermediate product formed from the reaction of the polyol and the polybasic acid or the anhydride is then reacted with a particular polyamine to form the amine terminated polyester of this invention. The particular polyamine employed in the practice of this invention contains two primary amine groups. The polyamines employed in the practice of this invention can best be expressed by the following formula:

$$H_2NR_2NH_2$$

wherein $R_2$ is an aliphatic hydrocarbon of 2–12 carbon atoms. Typical of the polyamines which can be employed in the practice of this invention and which can be used in place of the polyamines used in the examples are propylene diamine, 1,4-diamine butane and hexamethylene diamine. The preferred polyamine to be employed in the practice of this invention is ethylene diamine wherein $R_2$ is ethylene.

As stated previously, to provide the water-soluble methylolated amine terminated polyester of this invention, the above reaction product is then reacted with formaldehyde. The resulting compound corresponds to the following general formula:

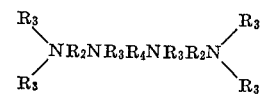
(I)

wherein $R_4$ is a carboxyl terminated polyester group prepared by reacting Z mols of a polyol with $Z+1$ mols of a member selected from the group consisting of a polybasic acid and a polybasic acid anhydride; $R_2$ is an aliphatic hydrocarbon of 2–12 carbon atoms; $R_3$ is independently selected from the group consisting of hydrogen and a methylol group —$CH_2OH$ providing that at least two $R_3$ groups are methylol groups and Z is an integer of from 1–200. In the practice of this invention, the preferred methylolated amine terminated polyester is one which corresponds to the following formula:

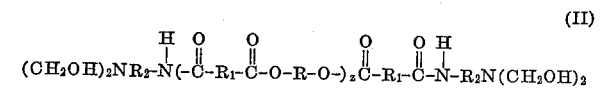
(II)

wherein R is selected from the group consisting of an aliphatic hydrocarbon of 2–18 carbon atoms, an aromatic hydrocarbon of 1 benzene ring, and an alicyclic hydrocarbon of 2–18 carbon atoms; $R_1$ is selected from the group consisting of an aliphatic hydrocarbon of 2–38 carbon atoms, an aromatic hydrocarbon of 1 benzene ring, and an alicyclic hydrocarbon of 2–38 carbon atoms; $R_2$ is an aliphatic hydrocarbon of 2–12 carbon atoms; and Z is an integer of from 1–50. More particularly, the preferred methylolated amine terminated polyester of this invention is that described by Formula II wherein R and $R_2$ are aliphatic hydrocarbons of 2–6 carbon atoms and $R_1$ is an aliphatic hydrocarbon of 4–10 carbon atoms. Specifically, the preferred methylolated amine terminated polyester compound of this invention is that described by Formula II wherein R and $R_2$ are ethylene and $R_1$ is butylene and Z is 1.

The methylolated amine terminated polyester of this invention is soluble in an aqueous phenol-aldehyde resin and when the resin composition is advanced to the infusible state, the resin has excellent flexibility as shown in the examples. Normally, a phenol-aldehyde resin of the phenol-formaldehyde type is very brittle when advanced to the infusible state and a cured resin film thereof will almost instantly crack or break upon attempting to bend the film. The phenol-aldehyde resins employed herein are the phenol-formaldehyde resins which are prepared by the reaction of 1.0–3.5 mols of formaldehyde per mol of phenol. The methylolated amine terminated polyester may be added to the kettle when manufacturing the phenol-formaldehyde, preferably at the end of the reaction thereof or it may be added prior to shipping or prior to using the phenol-formaldehyde resin. Phenol-formaldehyde resins are prepared by reacting as 1.0–3.5 mols of formaldehyde per mol of phenol and may be recovered either in water or in a water-organic solvent. With either type of phenol-formaldehyde resin, the methylolated amine terminated polyester of this invention is soluble in an aqueous phase of the phenol-formaldehyde resin.

The resin composition of this invention comprises an aqueous phenol-formaldehyde resin having dissolved therein a methylolated amine terminated polyester. The amount of the polyester which can be dissolved in the aqueous phase of the phenol-formaldehyde resin can vary between very wide limits depending upon the degree of flexibility desired and the end use application of the phenol-formaldehyde resin. Preferably, the amount to be dissolved therein can vary from 99.5–10 weight percent of the phenol-formaldehyde resin and, correspondingly, 0.5–90 weight percent of the amine terminated polyester. More particularly, the composition can consist of 95–60 weight percent of the phenol-formaldehyde resin and, correspondingly, 5–40 weight percent of the amine terminated polyester resin of this invention. When dissolving the amine terminated polyester in the phenol-formaldehyde resin, the resin composition will comprise either (1) a solution of the methylolated amine terminated polyester in the phenol-formaldehyde resin, or (2) a solution of the reaction product of the phenol-formaldehyde resin and the methylolated amine terminated polyester or (3) a solution of both (1) and (2).

It will thus be seen that the objects set forth above, among those made apparent from the preceding description, are efficiently attained and since certain changes may be made in carrying out the above process or method without departing from the scope of the invention, it is intended that all matter contained in the above description shall be interpreted as illustrative and not in a limiting sense.

What is claimed is:

1. A water-soluble methylolated amine terminated polyester corresponding to the following formula:

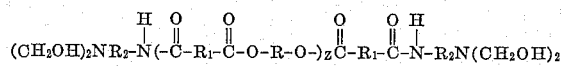

wherein R is selected from the group consisting of an aliphatic hydrocarbon of 2–18 carbon atoms, an aromatic hydrocarbon of 1 benzene ring, and an alicyclic hydrocarbon of 2–18 carbon atoms; $R_1$ is selected from the group consisting of an aliphatic hydrocarbon of 2–38 carbon atoms, and an aromatic hydrocarbon of 1 benzene ring and an alicyclic hydrocarbon of 2–38 carbon atoms; $R_2$ is an aliphatic hydrocarbon of 2–12 carbon atoms; and Z is an integer of from 1–50.

2. The composition of claim 1 wherein R is an aliphatic hydrocarbon of 2–6 carbon atoms.

3. The composition of claim 1 wherein R and $R_2$ are ethylene and $R_1$ is butylene.

4. An aqueous solution of the composition of claim 1.

5. An aqueous phenol-formaldehyde resin having dissolved therein a water soluble methylolated amine terminated polyester corresponding to the following formula:

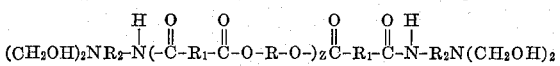

wherein R is selected from the group consisting of an aliphatic hydrocarbon of 2–18 carbon atoms, an aromatic hydrocarbon of 1 benzene ring, and an alicyclic hydrocarbon of 2–18 carbon atoms; $R_1$ is selected from the group consisting of an aliphatic hydrocarbon of 2–38 carbon atoms, an aromatic hydrocarbon of 1 benzene ring, and an alicyclic hydrocarbon of 2–38 carbon atoms; $R_2$ is an aliphatic hydrocarbon of 2–12 carbon atoms; and Z is an integer of from 1–50.

6. The composition of claim 5 wherein the phenol-formaldehyde resin is the reaction product of 1.0–3.5 mols of formaldehyde per mol of phenol.

7. The composition of claim 6 wherein R and $R_2$ are ethylene and $R_1$ is butylene.

8. The composition of claim 5 wherein the resin consists of 99.5–10 weight percent of the phenol-formaldehyde and, correspondingly, 0.5–90 weight percent of the methylolated amine terminated polyester.

9. A water-soluble methylolated amine terminated polyester corresponding to the following formula:

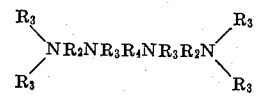

wherein $R_4$ is a carboxyl terminated polyester group prepared by reacting Z mols of a polyol with $Z+1$ mols of a member selected from the group consisting of a polybasic acid and a polybasic acid anhydride, $R_2$ is an aliphatic hydrocarbon of 2–12 carbon atoms, $R_3$ is a member selected from the group consisting of hydrogen and a methylol group (—$CH_2OH$) wherein at least two $R_3$ groups are methylol groups, and Z is an integer of from 1–200.

10. An aqueous phenol-formaldehyde resin having dissolved therein a water-soluble methylolated amine terminated polyester corresponding to the following formula:

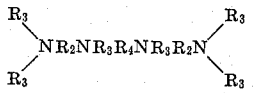

wherein $R_4$ is a carboxyl terminated polyester group prepared by reacting Z mols of a polyol with $Z+1$ mols of a member selected from the group consisting of a polybasic acid and a polybasic acid anhydride, $R_2$ is an aliphatic hydrocarbon of 2–12 carbon atoms, $R_3$ is a member selected from the group consisting of hydrogen and a methylol group (—$CH_2OH$) wherein at least two $R_3$ groups are methylol groups, and Z is an integer of from 1–200.

References Cited by the Examiner

UNITED STATES PATENTS

| | | | |
|---|---|---|---|
| 2,132,442 | 10/1938 | Rothrock | 260—75 |
| 2,199,900 | 5/1940 | Weith | 260—842 |
| 2,482,515 | 9/1949 | Sattler | 260—75 |
| 2,547,113 | 4/1951 | Drewitt et al. | 260—75 |
| 2,981,710 | 4/1961 | Hoenel | 260—29.3 |

MURRAY TILLMAN, *Primary Examiner.*

J. C. BLEUTGE, *Assistant Examiner.*